July 24, 1962 E. M. FELDMAN ET AL 3,046,401
AIRCRAFT VELOCITY RECORDING DEVICE
Filed Feb. 29, 1960 3 Sheets-Sheet 1

INVENTORS
EDWARD M. FELDMAN
DAVID F. GOULD II
BY
AGENT

July 24, 1962 E. M. FELDMAN ET AL 3,046,401
AIRCRAFT VELOCITY RECORDING DEVICE
Filed Feb. 29, 1960 3 Sheets-Sheet 2
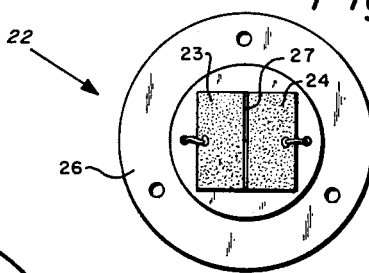
Fig. 4
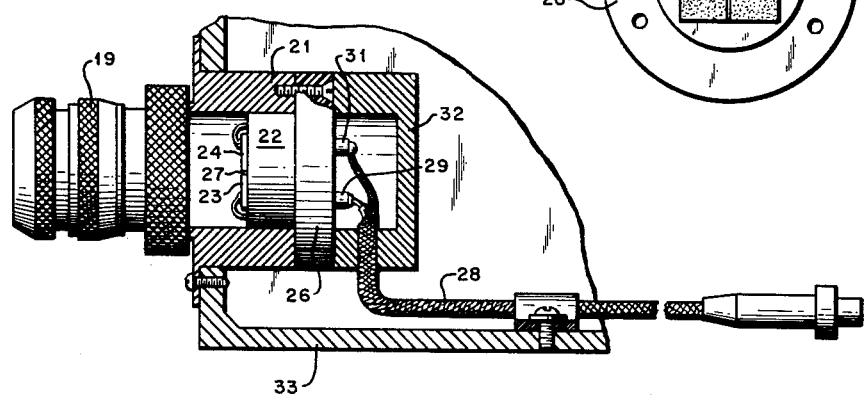
Fig. 3
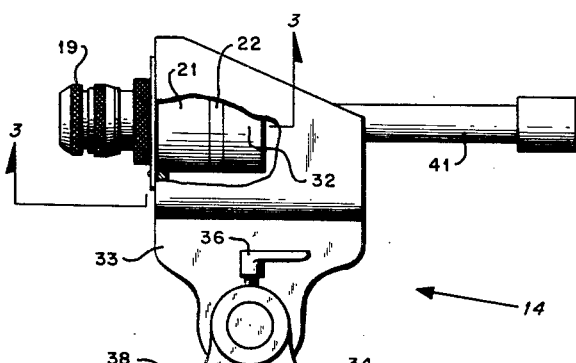
Fig. 2
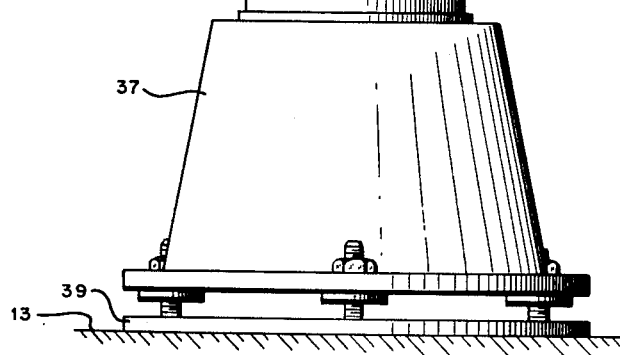
INVENTORS
EDWARD M. FELDMAN
DAVID F. GOULD II
BY
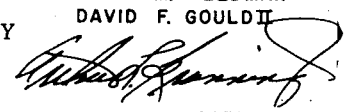
AGENT

INVENTORS
EDWARD M. FELDMAN
DAVID F. GOULD II

United States Patent Office 3,046,401
Patented July 24, 1962

3,046,401
AIRCRAFT VELOCITY RECORDING DEVICE
Edward M. Feldman, Baederwood, and David F. Gould II, Newtown, Pa., assignors to the United States of America as represented by the Secretary of the Navy
Filed Feb. 29, 1960, Ser. No. 11,936
10 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention relates to a velocity recording device and more particularly to an electronic velocity indicating system which, while not limited thereto, is particularly adapted to record the velocity of aircraft landing on a carrier.

In order to evaluate carrier arresting gear, aircraft performance, and aircraft operational criteria, there exists a requirement for a system to determine and record the engagement velocity of aircraft making carrier landings. The system in order to meet the above stated requirement must be capable of operating under conditions of adverse weather, shock and vibration, and radiant energy or electrical interference. To be useful the system must be easy to maintain, simple to operate, and must be capable of providing accurate and repeatable data at high data rates.

Known systems such as Doppler radar, light systems, and high speed camera systems are deficient in various respects particularly when utilized as above described.

Doppler radar systems are capable of providing reliable performance at relatively high data rates, but are characterized by being complex, expensive, and relatively difficult to maintain. Further, operational considerations preclude the use of Doppler radar specifically and exclusive for the purpose described. Thus, the design parameters of the radar apparatus cannot feasibly be optimized in order to provide for ideal performance of a specific function.

Light systems require complex and expensive optics in order to provide reliable performance with acceptable accuracy. Such systems are particularly and adversely affected by errors in the alignment of the various components which make up the system. In addition, the performance of such systems is adversely affected by less than ideal environmental conditions.

Camera systems of acceptable quality are complex, expensive, and, like light systems, the performance thereof degrades to an unacceptable degree when employed under adverse environmental conditions. Further such systems are not easily adapted for use in monitoring night carrier operations.

The present invention substantially overcomes the noted deficiencies in the above discussed prior art and provides a simple, reliable, and accurate velocity recording device that is characterized by being inexpensive to construct and simple to maintain and, in addition, provides a system the performance of which is little affected by the severe environmental conditions experienced, for example, in carrier operations.

According to one embodiment of the invention there is provided one or more pairs of sensors, each comprising a radiation detector mounted with simple optics, spaced a known distance apart along the path of motion of the object the velocity of which is to be determined. For example, the sensors may be mounted at the edge of the flight deck of a carrier parallel to the center line of the deck and adjacent the first arresting cable. Preferably the radiation detectors may have enhanced spectral response in the infrared region whereby in day carrier operations they may be energized by background sky radiation except when the fields of view thereof are obscured by a portion of a landing aircraft, for example the nose cone thereof. In night carrier operations the radiation detectors may be energized by any convenient aircraft borne heat source such as an incandescent lamp mounted on the nose cone of the aircraft. According to an important feature of the invention the configuration of the radiation detectors is such as to provide a narrow field of view in the direction of the path of motion of the aircraft or other object. Means may be provided to align the sensors whereby the planes symmetrically passing through the fields of view thereof are parallel and preferably transverse to the path of motion of the object.

It may be appreciated that the sensors emit a pulse when the fields of view thereof are pentrated by a moving object. The remainder of the illustrative embodiment, to be briefly described below, functions to determine the time interval between the occurrence of pulses from the sensors. Since the sensors and the fields of view thereof are spaced a known distance apart, the velocity of the object may easily be computed.

The sensors may be connected by cable to high gain, low noise amplifiers. A portion of the output signals from the amplifiers may be coupled to the input circuits of trigger generators while the output circuits thereof may be coupled to the control input of an electronic gating circuit. A stable oscillator or other clock signal source may be coupled to the signal input of the gating circuit and the output signal therefrom may be applied to a counter having digital read-out. Appropriate reset means may be provided for the counter if desired. In addition, it may sometimes be desirable to provide shaping networks connected between the amplifiers and the trigger generators in order to provide an input signal or more appropriate waveshape to the trigger generators.

It is therefore an object of the present invention to provide a simple, inexpensive, accurate, and reliable velocity recording device that is easy to maintain and is capable of operating under severe environmental conditions with little performance degradation.

It is a further and more specific object of the present invention to provide a device of the character described adapted to determine and record the velocity of landing aircraft.

It is a further and still more specific object of the present invention to provide a device of the character described adapted to determine and record the engaging velocity of aircraft landing on a carrier.

Other objects and many of the attendant advantages of this invention will be readily appreciated as the same become better understood by reference to the following detailed description when considered in connection with the accompanying drawings wherein:

FIG. 2 is a view in elevation illustrating certain structural features of one embodiment of the invention;

FIG. 3 is a partial horizontal section taken along line 3—3 of FIG. 2;

FIG. 4 is a simplified view of a radiation detector which may be employed in embodiments of the invention;

Figure 1:
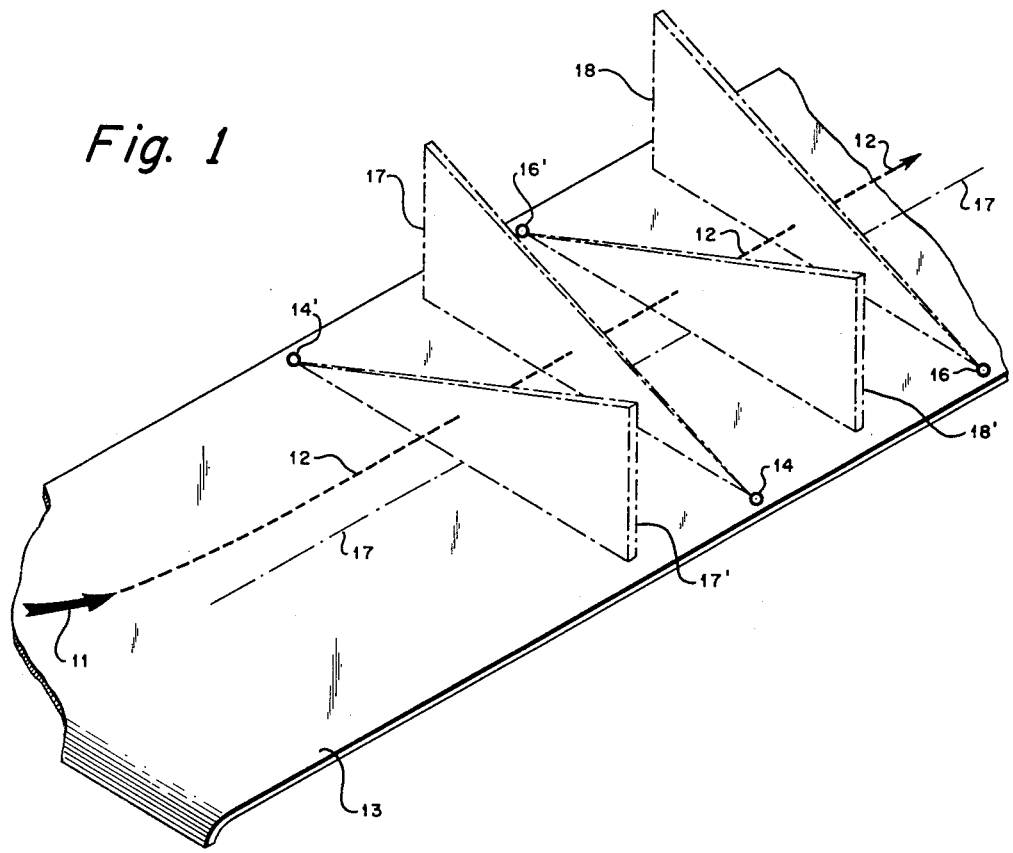
FIG. 1 depicts symbolically a contemplated use of the invention.

Referring now to FIG. 1 of the drawings, there is shown an aircraft symbolically represented by arrow 11 traversing a flight path 12 preparing to land upon the flight deck 13 of an aircraft carrier, further details of which are omitted for simplicity. A pair of sensors 14, 16, indicated symbolically in FIG. 1, are disposed along the edge of flight deck 13 a known distance apart, parallel to center line 17 thereof, and adjacent the first arresting cable (not shown).

In order to avoid measuring errors consequent to changes in the aspect of the landing aircraft it is desired that the sensors be capable of operating when the fields of view thereof are penetrated by the relatively small area nose cone portion of the landing aircraft or by a radiant energy source mounted thereon. For this purpose sensors 14, 16 are each constructed to provide an extremely narrow field of view in the direction of the flight path of the aircraft as indicated in FIG. 1 by the reference numerals 17, 18. The manner in which the desired field of view is obtained according to the invention will be explained below.

According to a contemplated embodiment of the invention sensors 14, 16 include radiation detectors having maximum spectral response in the infrared region. The performance of such detectors is adversely affected and the detectors may become damaged when direct solar radiation impinges thereon. Since at times the aircraft carrier may need to be positioned whereby direct solar radiation may impinge on sensors 14, 16 is may be desirable to provide a second pair of sensors 14', 16' similarly disposed along the edge of flight deck 13 opposite sensors 14, 16 and having fields of view as indicated by reference numerals 17', 18' in FIG. 1.

Referring now to FIGS. 2 through 4, which together illustrate certain structural features of one embodiment of the invention, there is shown a sensor 14 comprising a simple collimating optical system 19 threaded onto or otherwise affixed to a flanged cylindrical support member 21. A radiant energy detector generally indicated by the reference numeral 22 is affixed as by screws to support member 21 in the focal plane of optical system 19. As best seen in FIG. 4, detector 22 includes adjacent layers 23, 24 of gold or other conductive material adhered to nonconductive flanged base portion 26 and separated by an elongated photoconductive layer 27 which may, for example, be lead sulphide which has a maximum spectral response to radiant energy having a wavelength between approximately .25 and 3.5 microns. The conductors of a coaxial cable 28 are connected to terminals 29, 31 which are soldered or otherwise conductively affixed to portions 23, 24 of detector 22. Terminals 29, 31 may be enclosed by a protective cup-shaped member 32 and the sensor may be mounted within a housing 33 in any suitable manner. In the embodiment illustrated support member 21 is fastened by screws to housing 33.

By way of example, optical system 19 may have a focal length of one inch and the sensitive area 27 of detector 22 may be ⅜ mm. by 12 mm. These dimensions will provide a field of view 1 foot by 30 feet at a distance of 55 feet. With proper bias the detector will provide a usable output when one percent of the field of view thereof is obscured in day operations. For night operations the energy received from a 32 candlepower incandescent lamp will provide more than adequate response.

The sensors are aligned whereby the planes which contain the optical axes and the long dimensions of the sensitive elements thereof are parallel and preferably transverse to the flight path of the aircraft.

In order to permit alignment of sensor 14 in the vertical plane, housing 33 may be journaled in a trunnion member 34 and may be held in an adjusted position as by a friction lock mechanism 36. In a similar manner, in order to permit alignment of the sensor in a horizontal plane, trunnion member 34 may be journaled in a base member 37 and held in an adjusted position as by a friction lock mechanism 38. Base member 37 in turn may be bolted or otherwise securely fastened to a base plate 39 which may be welded to deck 13.

To facilitate the alignment procedure, a telescope 41 may be provided and secured to housing 33 in any convenient manner. Desired alignment of the sensor may easily be accomplished by sighting through telescope 41 upon a target temporarily erected, for example, adjacent center line 17 of deck 13.

It is to be understood that detector 22 has previously been aligned whereby the long dimension of the sensitive portion thereof is disposed symmetrically with respect to the axis of optical system 19, for example, in a substantially vertical position if the system is to be employed to measure horizontal velocity components.

While only sensor 14 has been described, it is to be understood that sensors 14', 16, and 16' may be substantially identical to sensor 14 and thus will not be specifically described.

Figure 5:
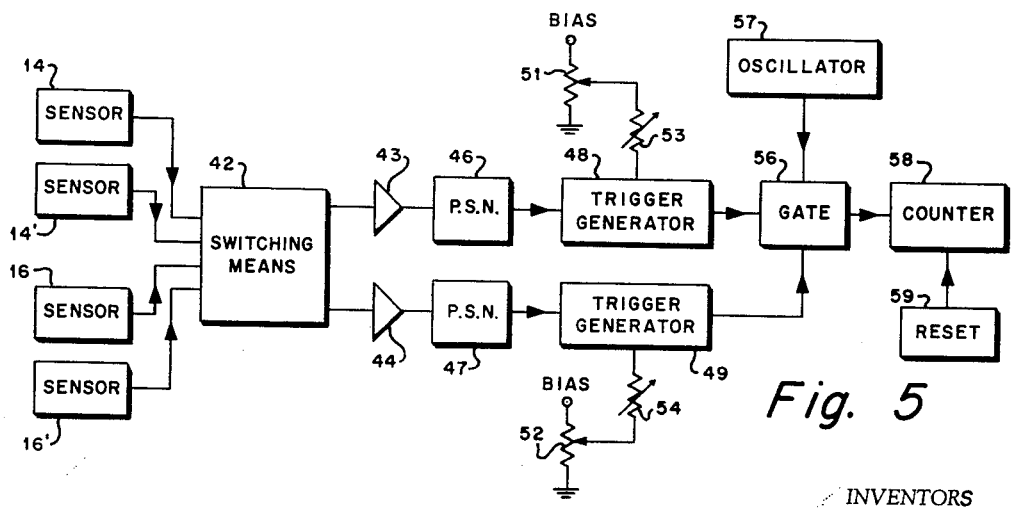
FIG. 5 is a block diagram of an electrical system which may be employed in practicing the invention.

Referring now to FIG. 5, which illustrates in block diagram form an electrical system which may be employed to practice the present invention, there is shown a switching means 42 coupled to sensors 14, 14', 16, and 16' to permit selection of the desired sensor pair. The signals from the selected sensor pair are coupled through switching means 42 to a pair of low noise, high gain amplifiers 43, 44 which include differentiating means in the input circuits thereof for a purpose to be described below.

The circuit thus far described is shown in more detail in FIG. 6 which will be later discussed.

Pulse shaping networks 46, 47 may be coupled between the output circuits of amplifiers 43, 44 and the input circuits of trigger generators 48, 49 in order to provide an input signal of appropriate waveshape to the trigger generators.

Trigger generators 48, 49 are provided with bias circuits comprising potentiometers 51, 52 and variable resistors 53, 54 in order to select the magnitude of the input signal at which trigger generators 48, 49 will provide triggering pulses. The trigger generators may comprise any suitable circuit known to the prior art such as a Schmidt trigger circuit and will not therefore be described in detail.

The trigger pulses from trigger generators 48, 49 may be coupled to the control input circuits of an electronic gating circuit 56 of any suitable type and the output signal from a stable oscillator 57 may be coupled to the signal input circuit of gate 56.

A standard pulse or cycle counter 58 of the type which provides a digital read-out is coupled to receive the gated output signal from gate 56. Conventional manual or automatic time delay reset means 59 may be provided in order to zero counter 58.

Figure 6:
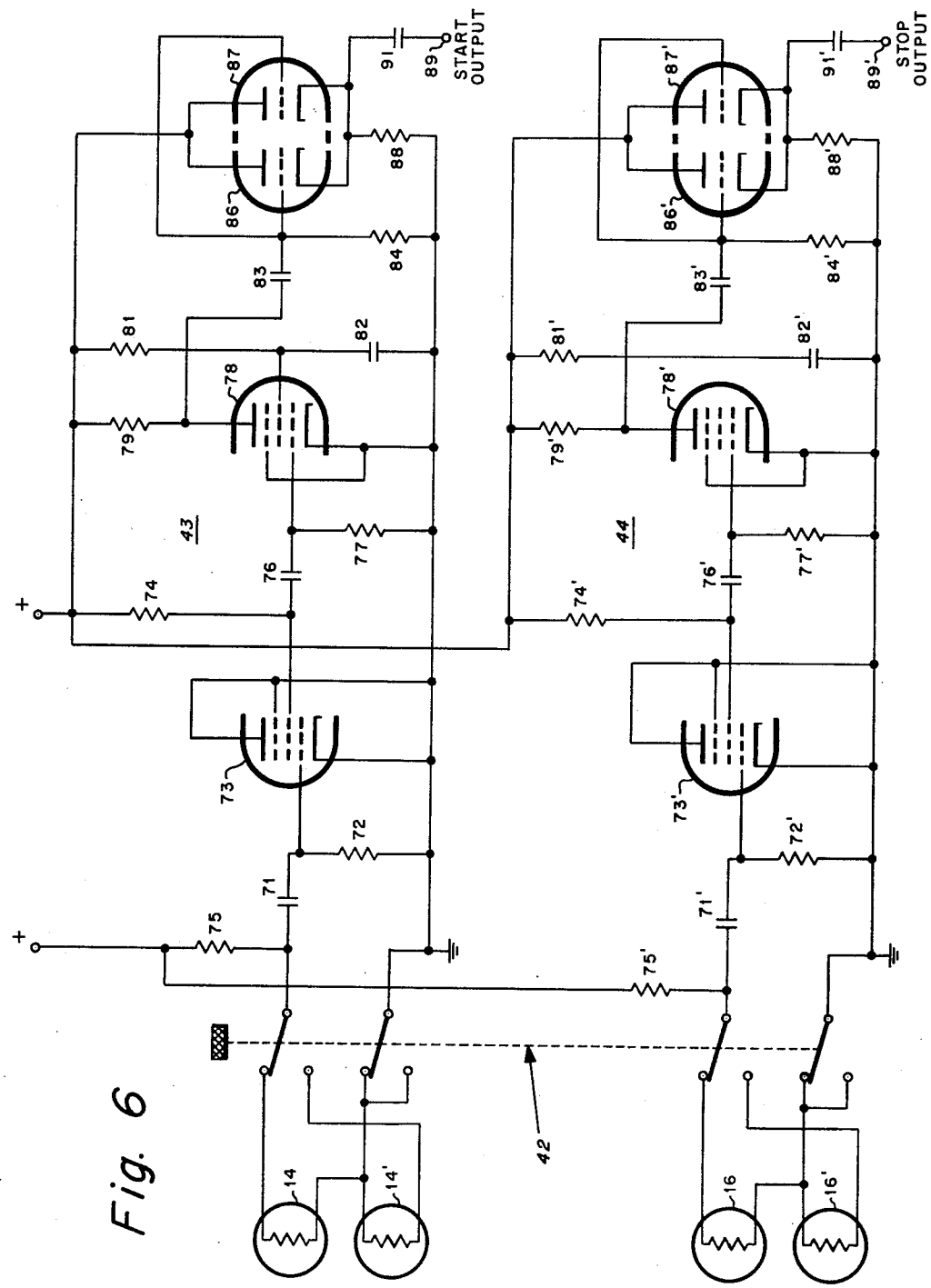
FIG. 6 is a detailed circuit diagram further illustrating portions of the electrical system shown in FIG. 5.

Referring now to FIG. 6, which illustrates certain portions of the electrical system of FIG. 5 in more detail, it may be seen that by operation of manually operable switch 42 sensor pairs 14, 16 or 14', 16' may be respectively coupled through networks comprising capacitors 71, 71' and resistors 72, 72' to amplifier stages 73, 73' of amplifiers 43, 44.

The values of capacitors 71, 71' and resistors 72, 72' are chosen whereby the networks function as differentiators to prevent operation of the circuit in response to slow moving objects or in response to random changes in ambient radiation levels and to provide both a positive and a negative pulse input to amplifiers 43, 44 which in response thereto provide corresponding amplified positive and negative output signals.

Amplifier stages 73, 73' provide low noise amplification with moderate gain with the screen grids thereof functioning as plates respectively coupled through resistors 74, 74' to a source of positive potential.

It is to be understood that the configuration of amplifier stages 73, 73' has been selected since for carrier applications of the present invention in order to avoid interference from adjacent radio or radar equipment or other electrical systems it has been found desirable to provide no amplification at the situs of the sensors and to locate the remainder of the system remotely from the sensors in an area where adequate shielding can be provided. The connection between the sensors and the remainder of the system may be made by coaxial cables.

Continuing with the description of FIG. 6, it may be seen that manually operable switch 42 functions also to apply bias voltages to the photoconductive portions of the selected sensor pair through resistors 75, 75'.

The output signals from amplifier stages 73, 73' may be coupled through networks comprising capacitors 76, 76' and resistors 77, 77' to high gain amplifier stages comprising pentodes 78, 78' provided with plate resistors 79, 79' coupled to B+. The screen grids of pentodes 78, 73' are coupled respectively in a conventional manner to biasing networks comprising resistors 81, 81' and capacitors 82, 82'.

The connections between amplifiers 43, 44 and pulse shaping networks 46, 47 may be made by low impedance coaxial cables. Accordingly, to provide a low impedance output from amplifiers 43, 44, the output signals from amplifier stages 78, 78' may be coupled through networks comprising capacitors 83, 83' and resistors 84, 84' to cathode follower circuits comprising parallel connected triode sections 86, 87 and 86', 87' which are respectively provided with cathode resistors 88, 88'. It is to be understood that the triode sections may be replaced by single triodes of appropriate types.

Start and stop output terminals 89, 89' are respectively coupled to cathode resistors 88, 88' via coupling capacitors 91, 91' and to pulse shaping networks 46, 47.

Having thus described an embodiment of the invention, the mode of operation thereof will now be set forth.

In day carrier operations the photoconductive portions of sensors 14, 16, or 14', 16', as the case may be, are energized by background sky radiation. When the fields of view of the sensors are successively obscured, for example, by the nose cone of an aircraft, the resistances of the photoconductive portions thereof increase causing positive pulses (in the circuit configuration shown) to be successively coupled through differentiating networks 71, 72, and 71', 72' to amplifiers 43, 44. The amplified and shaped pulse outputs cause successive actuation of trigger generators 48, 49. The occurrence of a trigger pulse from trigger generator 48 opens gate 56 permitting signals from stable oscillator 57 to be coupled to counter 58, while the occurrence of a pulse from trigger generator 49 closes the gate isolating oscillator 57 from counter 58. It is to be understood that trigger generators 48, 49 and gate 56 may be arranged to operate upon either positive or negative signals. By virtue of the operation of differentiating networks 71, 72, and 71', 72' both positive and negative signals are supplied from amplifiers 43, 44.

The time interval between the occurrence of triggers from trigger generators 48, 49 is indicated by the number of cycles which counter 58 receives from oscillator 57. This value of multiples or submultiples thereof is visibly indicated in digital form by the counter. By reference to previously prepared tables, the operator may easily convert the cycle or pulse count thus displayed representing the above-mentioned time interval into aircraft velocity.

Operation of reset means 59 prepares the system for recording the velocity of the next landing aircraft.

The system functions to monitor night carrier operations in a similar manner. When the fields of view of the selected sensor pair are successively penetrated by a nose cone mounted incandescent lamp or other heat source the sensors emit successive negative pulses. Since the system is not polarity sensitive, the subsequent mode of operation thereof is as above described.

The high gain provided by amplifiers 43, 44 permits operation on the initial portions of the signals obtained respectively from the sensors thus minimizing any errors occasioned by dissimilarities in the waveshapes of the signals.

While the invention has been described for use in measuring and recording aircraft engagement velocities, many other uses are possible, for example, measuring catapult velocities and measuring missile or other vehicle velocities.

In addition it is obvious that many modifications and variations of the present invention are possible in the light of the above teachings. It is therefore to be understood that within the scope of the appended claims, the invention may be practiced otherwise than as specifically described.

What is claimed is:

1. A velocity recording device comprising: a pair of sensors adapted to be spaced a known distance apart along the path of motion of an object the velocity of which is to be determined, each of said sensors comprising an optical system, and a member having a planar surface in the focal plane of said optical system, said member including an elongated radiant energy sensitive element symmetrically disposed on said planar surface with respect to said optical axis; means to align said sensors whereby the planes which respectively contain the optical axis of a sensor and the long dimension of the element thereof are parallel; differentiating means coupled to said elements; amplifier means having the input circuit thereof coupled to said differentiating means; trigger generating means having the input circuit thereof coupled to the output circuit of said amplifier means; a timing signal source; gating circuit means having the input circuits thereof respectively coupled to said timing signal source and to the output circuit of said trigger generating means; and counter means having the input circuit thereof coupled to the output circuit of said gating circuit means.

2. A velocity recording device comprising: a pair of sensors adapted to be spaced a known distance apart along the path of motion of an object the velocity of which is to be determined, each of said sensors comprising an optical system, and a member having a planar surface in the focal plane of said optical system, said member including an elongated photoconductive element having enhanced spectral response to radiant energy having wavelengths between approximately 0.25 and 3.5 microns symmetrically disposed on said planar surface with respect to said optical axis; means to align said sensors whereby the planes which respectively contain the optical axis of a sensor and the long dimension of the element thereof are parallel; differentiating means coupled to said elements; amplifier means having the input circuit thereof coupled to said differentiating means; trigger generating means having the input circuit thereof coupled to the output circuit of said amplifier means; a timing signal source; gating circuit means having the input circuits thereof respectively coupled to said timing signal source and to the output circuit of said trigger generating means; and counter means having the input circuit thereof coupled to the output circuit of said gating circuit means.

3. A velocity recording device comprising: a pair of sensors adapted to be spaced a known distance apart in a direction parallel to the path of motion of an object the velocity of which is to be determined, each of said sensors comprising an optical system, and a member having a planar surface in the focal plane of said optical system, said member including an elongated radiant energy sensitive element symmetrically disposed on said planar surface with respect to said optical axis; means to align each of said sensors whereby the planes which contain the axes of the optical portions thereof and the long dimensions of said elements are parallel to each other and transverse to the path of motion of said object; differentiating means coupled to said elements; amplifier means having the input circuit thereof coupled to said differentiating means; trigger generating means having the input circuit thereof coupled to the output circuit of said amplifier means; a timing signal source; gating circuit means having the input circuits thereof respectively coupled to said timing signal source and to the output circuit of said trigger generating means; and counter means having the input circuit thereof coupled to the output circuit of said gating circuit means.

4. A velocity recording device comprising: a pair of sensors adapted to be spaced a known distance apart in a direction parallel to the path of motion of an object the velocity of which is to be determined, each of said sensors comprising an optical system, and a member having a planar surface in the focal plane of said optical system, said member including an elongated photoconductive element having enhanced spectral response to radiant energy having wavelengths between approximately 0.25 and 3.5 microns symmetrically disposed on said planar surface with respect to said optical axis; means to align each of said sensors whereby the planes which contain the axes of the optical portions thereof and the long dimensions of said elements are parallel to each other and transverse to the path of motion of said object; differentiating means coupled to said elements; amplifier means having the input circuit thereof coupled to said differentiating means; trigger generating means having the input circuit thereof coupled to the output circuit of said amplifier means; a timing signal source; gating circuit means having the input circuits thereof respectively coupled to said timing signal source and to the output circuit of said trigger generating means; and counter means having the input circuit threof coupled to the output circuit of said gating circuit means.

5. A velocity recording device comprising: a pair of sensors adapted to be spaced a known distance apart in a direction parallel to the path of motion of an object the velocity of which is to be determined, each of said sensors comprising an optical system, and a member having a planar surface in the focal plane of said optical system, said member including an elongated radiant energy sensitive element symmetrically disposed on said planar surface with respect to said optical axis; means to align each of said sensors whereby the planes which contain the axes of the optical portions thereof and the long dimensions of said elements are parallel to each other and transverse to the path of motion of said object; differentiating means coupled to said elements; amplifier means having the input circuit thereof coupled to said differentiating means; trigger generating means having the input circuit thereof coupled to the output circuit of said amplifier means; an oscillator; gating circuit means having the input circuits thereof respectively coupled to said oscillator and to the output circuit of said trigger generating means; a cycle counter providing digital read-out and having the input circuits thereof coupled to the output circuit of said gating circuit means; and reset means for said counter.

6. A velocity recording device comprising: a pair of sensors adapted to be spaced a known distance apart in a direction parallel to the path of motion of an object the velocity of which is to be determined, each of said sensors comprising an optical system, and a member having a planar surface in the focal plane of said optical system, said member including an elongated photoconductive element having enhanced spectral response to radiant energy having wavelengths between approximately 0.25 and 3.5 microns symmetrically disposed on said planar surface with respect to said optical axis; means to align each of said sensors whereby the planes which contain the axes of the optical portions thereof and the long dimensions of said elements are parallel to each other and transverse to the path of motion of said object; differentiating means coupled to said elements; amplifier means having the input circuit thereof coupled to said differentiating means; trigger generating means having the input circuit thereof coupled to the output circuit of said amplifier means; an oscillator; gating circuit means having the input circuits thereof respectively coupled to said oscillator and to the output circuit of said trigger generating means; a cycle counter providing digital read-out and having the input circuit thereof coupled to the output circuit of said gating circuit means; and reset means for said counter.

7. A device for recording the engagement velocity of an aircraft landing on a carrier comprising: a first pair of sensors spaced a known distance apart along one edge of the flight deck of said carrier parallel to the center line of said deck adjacent an arresting gear cable thereon, and a second pair of sensors similarly disposed along said flight deck opposite from said first pair of sensors, each of said sensors comprising an optical system, and a member having a planar surface in the focal plane of said optical system, said member including an elongated radiant energy sensitive element symmetrically disposed on said planar surface with respect to said optical axis; means to align each sensor pair whereby the planes which respectively contain the optical axis of a sensor and the long dimension of the element thereof are parallel and transverse to the center line of said deck; differentiating means; amplifier means having an input circuit coupled to said differentiating means; switching means operable to selectively couple the elements of said first or said second pair of sensors to said differentiating means; trigger generating means having the input circuit thereof coupled to the output circuit of said amplifier means; a timing signal source; gating circuit means having the input circuits thereof coupled to said timing signal source and to the output circuit of said trigger generating means; and counter means having the input circuit thereof coupled to the output circuit of said gating circuit means.

8. A device for recording the engagement velocity of an aircraft landing on a carrier comprising: a first pair of sensors spaced a known distance apart along one edge of the flight deck of said carrier parallel to the center line of said deck adjacent an arresting gear cable thereon, and a second pair of sensors similarly disposed along said flight deck opposite from said first pair of sensors, each of said sensors comprising an optical system, and a member having a planar surface in the focal plane of said optical system, said member including an elongated photoconductive element having enhanced spectral response to radiant energy having wavelengths between approximately 0.25 and 3.5 microns symmetrically disposed on said planar surface with respect to said optical axis; means to align each sensor pair whereby the planes which respectively contain the optical axis of a sensor and the long dimension of the element thereof are parallel and transverse to the center line of said deck; differentiating means; amplifier means having an input circuit coupled to said differentiating means; switching means operable to selectively couple the elements of said first or said second pair of sensors to said differentiating means; trigger generating means having the input circuit thereof coupled to the output circuit of said amplifier means; a timing signal source; gating circuit means having the input circuits thereof coupled to said timing signal source and to the output circuit of said trigger generating means; and counter means having the input circuit thereof coupled to the output circuit of said gating circuit means.

9. A device for recording the engagement velocity of an aircraft landing on a carrier comprising: a first pair of sensors spaced a known distance apart along one edge of the flight deck of said carrier parallel to the center line of said deck adjacent an arresting gear cable thereon, and a second pair of sensors similarly disposed along said flight deck opposite from said first pair of sensors, each of said sensors comprising an optical system, and a member having a planar surface in the focal plane of said optical system, said member including an elongated radiant energy sensitive element symmetrically disposed on said planar surface with respect to said optical axis; means to align each sensor pair whereby the planes which respectively contain the optical axis of a sensor and the long dimension of the element thereof are parallel and transverse to the center line of said deck; differentiating means; amplifier means having an input circuit coupled to said differentiating means; switching means operable to selectively couple the elements of said first or said second pair of sensors to said differentiating means; trigger generating means having the input circuit thereof coupled to the output circuit of said amplifier means; an oscillator; gating circuit means having the input circuits thereof respectively coupled to said oscillator and to the output circuit of said trigger generating means; a cycle counter providing digital read-out and having the input circuit thereof coupled to the output circuit of said gating circuit means; and reset means for said counter.

10. A device for recording the engagement velocity of an aircraft landing on a carrier comprising: a first pair of sensors spaced a known distance apart along one edge of the flight deck of said carrier parallel to the center line of said deck adjacent an arresting gear cable thereon, and a second pair of sensors similarly disposed along said flight deck opposite from said first pair of sensors, each of said sensors comprising an optical system, and a member having a planar surface in the focal plane of said optical system, said member including an elongated photoconductive element having enhanced spectral response to radiant energy having wavelengths between approximately 0.25 and 3.5 microns symmetrically disposed on said planar surface with respect to said optical axis; means to align each sensor pair whereby the planes which respectively contain the optical axis of a sensor and the long dimension of the element thereof are parallel and transverse to the center line of said deck; differentiating means; amplifier means having an input circuit coupled to said differentiating means; switching means operable to selectively couple the elements of said first or said second pair of sensors to said differentiating means; trigger generating means having the input circuit thereof coupled to the output circuit of said amplifier means; an oscillator; gating circuit means having the input circuits thereof respectively coupled to said oscillator and to the output circuit of said trigger generating means; a cycle counter providing digital read-out and having the input circuit thereof coupled to the output circuit of said gating circuit means; and reset means for said counter.

References Cited in the file of this patent
UNITED STATES PATENTS

| | | |
|---|---|---|
| 2,866,373 | Doyle et al. | Dec. 30, 1958 |
| 2,918,581 | Willey et al. | Dec. 22, 1959 |
| 2,944,151 | Whitney et al. | July 5, 1960 |
| 2,975,284 | Osborne | Mar. 14, 1961 |
| 2,992,330 | Cooper et al. | July 11, 1961 |